United States Patent [19]

Takaoka et al.

[11] Patent Number: 5,340,893
[45] Date of Patent: Aug. 23, 1994

[54] CAST RESIN FOR OPTICAL USE

[75] Inventors: Toshiaki Takaoka; Katsuyoshi Tanaka; Kenji Kato, all of Oita, Japan

[73] Assignees: NOF Corporation; Seiko Epson Corporation, both of Tokyo, Japan

[21] Appl. No.: 967,715

[22] Filed: Oct. 28, 1992

[30] Foreign Application Priority Data

Nov. 1, 1991 [JP] Japan .................. 3-288098

[51] Int. Cl.$^5$ .................. C08F 18/18; C08F 18/24; C08F 222/26
[52] U.S. Cl. .................. 526/292.4; 526/314; 526/323
[58] Field of Search .................. 526/292.4, 314, 323

[56] References Cited

U.S. PATENT DOCUMENTS 4,930,879 6/1990 Iryo et al. .................. 526/292.4
4,948,854 8/1990 Amaya et al. .................. 526/314

*Primary Examiner*—Peter Szekely
*Attorney, Agent, or Firm*—Darby & Darby

[57] ABSTRACT

A cast resin for optical use is obtained by polymerizing 40 to 89 wt % of a diallyl phthalate component represented by the formula (I)

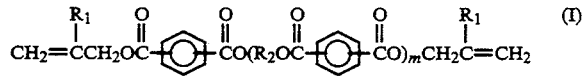

wherein —$R_1$ is a hydrogen atom or a methyl group, —$OR_2$ is a dihydric alcohol residue having 1 to 5 carbon atoms and m is an integer of from 0 to 20, 10 to 59 wt % of an alkylene glycol bis-allyl carbonate component represented by the formula (II)

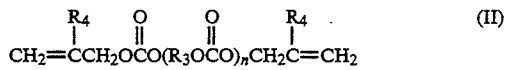

wherein —$R_4$ is a hydrogen atom or a methyl group, —$OR_3$ is a dihydric alcohol residue having 1 to 10 carbon atoms and n is an integer of from 0 to 10, and 1 to 30 wt % of a vinyl compound represented by the formula (III)

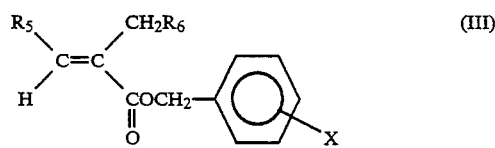

wherein —$R_5$ and —$R_6$ stand for a hydrogen atom or a group

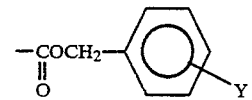

wherein X and Y each indicate a hydrogen atom or a halogen atom other than a fluorine atom.

10 Claims, No Drawings

CAST RESIN FOR OPTICAL USE

BACKGROUND OF THE INVENTION

This invention relates to a cast resin having superior mechanical strength and optical properties such as transparency and refractive index.

Recently, the resin glass which is superior to inorganic glass in impact-resistance, lightweight, castability and dyeability has become popular in the field of eyeglass lenses. The resin glass may be exemplified by polymethyl methacrylate, polydiethylene glycol bis-allyl carbonate, polystyrene or polycarbonate. However, the above-mentioned polymethyl methacrylate or polydiethylene glycol bis-allyl carbonate, while being superior in lightweight, impact-resistance and castability, suffers From the drawback that they are not suited to high magnification and reduction in weight because their refractive index is as low as about 1.49 and a larger lens thickness than in the case of the inorganic glass is required if they are to be used as lenses. On the other hand, the above-mentioned polystyrene or polycarbonate, while having a high refractive index of the order of 1.58 to 1.59, suffers from the drawback that since they are thermoplastic resins, they are susceptible to optical distortion due to double refraction during injection molding, while being inferior in resistance to solvents or scratch-resistance and being low in Abbe's number or adhesivity to a hard coat film which is deposited for improving surface hardness. Various technological proposals have been made for overcoming the above-mentioned deficiencies. For example, a resin glass consisting of a copolymer of diethylene glycol bis-allyl carbonate and diallyl isophthalate has been proposed in Japanese Laid-Open Patent Publication No.53-7787 (1978), while a resin glass consisting of a copolymer of diallyl isophthalate and di(meth)acrylate having Bisphenol A and diethylene glycol bis-allyl carbonate has been proposed in Japanese Laid-Open Patent Publication No.59-191708 (1984). However, these resin glasses suffer from the drawback that they are poor in impact-resistance and weatherability and that a non-reacted monomer tends to be left due to the difference in copolymerizabilty to render it difficult to control the reaction during the polymerization process.

Besides, a resin glass consisting of a dibenzyl fumarate-diallyl phthalate copolymer has been proposed in Japanese Laid-Open Patent Publication No.62-235901 (1987), while a resin glass consisting in a copolymer of dibenzyl itaconate or dibenzyl mesaconate with diallyl phthalate and a resin glass consisting of a copolymer of diallyl tere(iso)phthalate prepolymer, methyl (meth)acrylate and an aromatic mono(di) carboxylic acid (alkyl)allylester have been proposed in Japanese Laid-Open Patent Publication No.64-45412 (1989) and in Japanese Patent Publication No.1-60494 (1989). However, these resin glasses suffer from a drawback that they are inferior in impact-resistance.

A resin glass consisting of a diethylene glycol bis-allyl carbonate oligomer proposed in Japanese Laid-Open Patent Publication No.59-140214 (1984) has a drawback that it is low in refractive index and may become stained in color.

A resin glass consisting of a diallyl terephthalate oligomer-vinyl monomer copolymer proposed in Japanese Laid-Open Patent publication No.3-54213 (1991), has a drawback that it is inferior in impact-resistance.

A resin glass consisting of a copolymer of a styrene derivative with a heavy metal salt of unsaturated carboxylic acid, and a resin glass consisting of a copolymer of a nucleus halogen-substituted diallyl phthalate with a nucleus halogen-substituted allyl benzoate, proposed in Japanese Laid-Open Patent Publications Nos.57-28115 (1982) and 60-55007 (1985), respectively, suffer from the drawback that while having a higher refractive index of the order of 1.58 to 1.60, they are higher in specific gravity and hence inferior in lightweight because of the content of larger amounts of heavy metal ions and halogen atoms.

A resin glass consisting of a copolymer of a styrene monomer and a di(meth)acrylate monomer containing Bisphenol A with an aryl methacrylate monomer has also been proposed in Japanese Laid-Open Patent Publication No.55-13747 (1980). This resin glass has, however, a drawback that the lens formed of the resin glass tends to be stained in color, while the resin glass is inferior in impact-resistance and adhesivity to a hard coat film.

A resin glass consisting of a copolymer of a hydroxy di(meth)acrylate having an aromatic ring, a diisocyanate monomer and a styrene monomer has been proposed in Japanese Laid-Open Patent Publication No.59-133211 (1984). This resin glass has a drawback that while having a higher refractive index of the order of 1.60, it is only poor in weatherability and higher in specific gravity. Finally, a resin glass which is prepared by mixing a peroxyester as a curing agent to a monomer composition composed of methacrylate, a polyfunctional methacrylate and diacrylate and curing the resulting mixture by heating and which is superior in transparency and high in refractive index, has been proposed in Japanese Laid-Open Patent Publication No.3-70715 (1991). This polymer has, however, a drawback that it is inferior in adhesivity to a hard coat film and has a higher specific gravity.

SUMMARY OF THE INVENTION

It is an object of the present invention to provide a cast resin for optical use which has a high refractive index and which is superior in transparency, mechanical strength, resistance to solvents and weatherability.

The above and other objects of the present invention will become apparent from the following description.

In accordance with the present invention, there is provided a cast resin for optical rise obtained by polymerizing 40 to 89 wt % of a diallyl phthalate component represented by the formula (I)

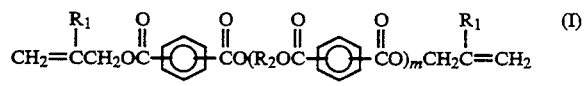

wherein —$R_1$ is a hydrogen atom or a methyl group, —$OR_2$ is a dihydric alcohol residue having 1 to 5 carbon atoms and m is an integer of from 0 to 20, 10 to 59 wt % of an alkylene glycol bis-allyl carbonate component represented by the formula (II)

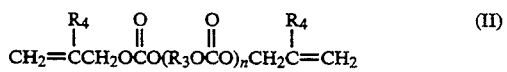

wherein —$R_4$ is a hydrogen atom or a methyl group, —$OR_3$ is a dihydric alcohol residue having 1 to 10 carbon atoms and n is an integer of from 0 to 10, and 1 to 30 wt % of a vinyl compound represented by the Formula (III)

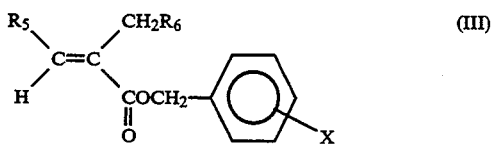

wherein —$R_5$ and —$R_6$ each indicate different groups and stand for a hydrogen atom or a group

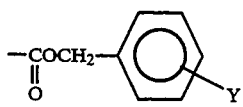

wherein X and Y each indicate a hydrogen atom or a halogen atom other than a fluorine atom.

DESCRIPTION OF THE PREFERRED EMBODIMENTS

The present invention will be explained in more detail hereinbelow.

The cast resin according to the present invention is obtained by polymerizing polymerizable components inclusive of a particular diallyl phthalate component, a particular alkylene glycol bis-allyl carbonate component and a particular vinyl compound in the specified proportions.

The above-mentioned particular diallyl phthalate component (component 1), employed as an essential polymerizable component according to the present invention, is represented by the following formula (I):

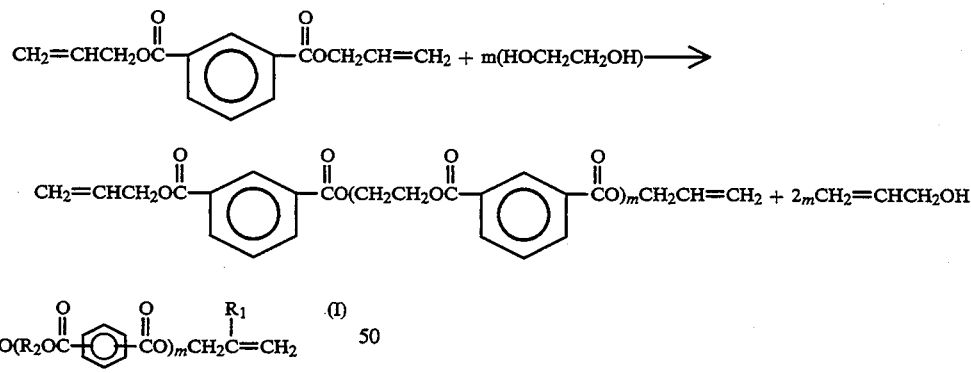

wherein —$R_1$ is a hydrogen atom or a methyl group, —$OR_2$ is a dihydric alcohol residue having 1 to 5 carbon atoms and m an integer of from 0 to 20.

In the above component 1, if the number of carbon atoms of $R_2$ exceeds 8, the resin is lowered in thermal resistance and refractive index. There is no particular limitation to the value of m if it is an integer in a range of from 0 to 20. However, in view of difficulties met in controlling the molecular weight during the production, is; preferred to use a prepolymer composed of fractions having different values of m so that the prepolymer as a whole exhibits certain pattern of distribution of the value of m. Although there is no particular limitation to the manner of distribution, the prepolymer may preferably be composed of 20 to 70 wt % of a fraction with m=0, 20 to 40 wt % of a fraction with m=1, 1 to 20 wt % of a fraction with m=2, 0 to 20 wt % of a fraction with m=3, 0 to 15 wt % of a fraction with m=4, 0 to 10 wt % of a fraction with m=5 and 0 to 10 wt % of a fraction with $6 \leq m \leq 20$, if impact-resistance, refractive index or viscosity, above all, of the resulting resin are to be improved. If the amount of the fraction with m=0 is less than 20 wt %, the resin is undesirably increased in viscosity. If the amount of the fraction with m=0 exceeds 70 wt %, the resin is undesirably lowered in impact-resistance. If the amount of the fraction with $6 \leq m \leq 20$ exceeds 10 wt %, the resin is undesirably increased in viscosity. On the other hand, if the value of m exceeds 20, the resin is undesirably increased in viscosity. The component 1 may be prepared by ester interchange reaction between diallyl phthalate and dihydric alcohol preferably for 2 to 12 hours at 50° to 200° C. in the presence of a catalyst. The component 1 having the above-mentioned pattern of distribution of the value of m may be easily prepared by specifying the amounts of the starting materials and suitably adjusting the reaction temperature, the reaction time and the reaction pressure. Diallyl phthalates which may be employed may be enumerated by diallyl phthalate, diallyl isophthalate and diallyl terephthalate, while dihydric alcohols may be enumerated by ethylene glycol, propylene glycol, 1,3-propanediol, 1,4-butanediol, 1,3-butanediol and neopentyl glycol. The above-mentioned catalysts may be enumerated by alkali metal hydroxides, such as potassium hydroxide or sodium hydroxide, alcholates, calcium compounds, magnesium compounds, zinc compounds, cadmium compounds, titanium compounds, germanium compounds, tin compounds, lead compounds, manganese compounds and antimony compounds. A typical reaction employing diallyl isophthalate and ethylene glycol may be illustrated by the following formula:

$$CH_2=CHCH_2OC-\bigcirc-COCH_2CH=CH_2 + m(HOCH_2CH_2OH) \longrightarrow$$

$$CH_2=CHCH_2OC-\bigcirc-CO(CH_2CH_2OC-\bigcirc-CO)_mCH_2CH=CH_2 + 2_mCH_2=CHCH_2OH$$

It is necessary that the component 1 be used in an amount in a range of from 40 to 89 wt % based on the total weight of the polymerizable components. If the amount of the component 1 is less than 40 wt % the resulting resin is lowered in refractive index, whereas if the amount exceeds 89 wt % the resulting resin is lowered in impact-resistance and in color hues.

According to the present invention, the above-mentioned alkylene glycol bis-allyl carbonate component (component 2) employed as an essential polymerizable component along with the component 1, is represented by the following formula (II):

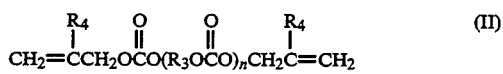

wherein —R₄ is a hydrogen atom or a methyl group, —OR₃ is a dihydric alcohol residue having 1 to 10 carbon atoms, and n is an integer of from 1 to 10.

In the above component 2, the number of carbon atoms of R₃ exceeding 10 is not desirable because the resin is lowered in thermal resistance. There is no particular limitation to the value of n if it is an integer in a range of from 0 to 10. However, in view of difficulties met in controlling the molecular weight during the production, it is preferred to use a prepolymer composed of fractions having different values of n so that the prepolymer as a whole exhibits a certain pattern of distribution of the value of n. Although there is no particular limitation to the manner of distribution, the prepolymer may preferably be composed of 20 to 60 wt % of a fraction with n=1, 25 to 40 wt % of a fraction with n=2, 5 to 25 wt % of a fraction with n=3, 1 to 20 wt % of a fraction with n=4 and 0 to 15 wt % of a fraction with 5≦n≦10 for improving impact-resistance, refractive index and viscosity of the resulting resin.

The component 2 may be prepared by ester interchange reaction between diallyl carbonate and dihydric alcohol preferably for 2 to 12 hours at 50° to 200° C. in the presence of a catalyst. The component 2 having the above-mentioned pattern of distribution of the value of n may be easily prepared by specifying the amounts of the starting materials and suitably adjusting the reaction temperature, the reaction time and the reaction pressure. The dihydric alcohols which may be employed may be enumerated by ethylene glycol, propylene glycol, 1,3-propanediol, 1,4-butanediol, 1,3-butanediol, neopentyl glycol diethylene glycol and dipropylene glycol. The catalysts enumerated for the preparation of the component 1 may be employed for the preparation of the component 2.

The amount of the component 2 which is to be employed is 10 to 59 wt % based on the total weight of the polymerizable components. If the amount of the component 2 employed is less than 10 wt % the resulting resin becomes inferior in impact-resistance, color hue or adhesivity to the hard coat film, whereas if it exceeds 59 wt % the resultant resin is lowered in refractive index.

According to the present invention, the above-mentioned particular vinyl compound, employed as an essential polymerizable component along with the components 1 and 2, is represented by the following formula (III):

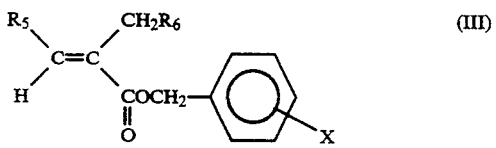

wherein R₅ and R₆ indicate different groups and each represent a hydrogen atom or a group

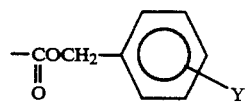

wherein X and Y each indicate a hydrogen atom or a halogen atom other than a fluorine atom.

The vinyl compound 3 may be enumerated by, for example dibenzyl itaconate, dibenzyl mesaconate, bis (2-chlorobenzyl) itaconate, bis (4-chlorobenzyl) itaconate, bis(2-chlorobenzyl) mesaconate, bis(4-chlorobenzyl) mesaconate, bis(2-bromobenzyl) itaconate, bis(4-bromobenzyl) itaconate, bis(2-bromobenzyl) mesaconate and bis(4-bromobenzyl) mesaconate.

The amount of the vinyl compound 3 employed is in a range of from 1 to 30 wt % based on the total weight of the polymerizable components and preferably in a range of 3 to 20 wt % in view of the color hue, impact-resistance and thermal resistance. If the amount is less than 1 wt %, the resultant resin becomes inferior in color hue and impact-resistance, whereas if it exceeds 30 wt %, the resultant resin becomes inferior in thermal resistance.

Although only the components 1 and 2 and the vinyl compound 3 may be employed as the polymerizable components according to the present invention, one or more of other vinyl monomers may also be employed. These vinyl monomers which may be employed preferably include styrene, p-methylstyrene, p-chlorostyrene, divinyl benzene, α-methylstyrene, vinyl acetate, vinyl benzoate, allyl benzoate, divinyl phthalate, vinyl naphthalene, (meth)acrylic acid, 2-hydroxyethyl (meth)acrylate, 2-hydroxypropyl (meth)acrylate, glycidyl (meth)acrylate, methyl (meth)acrylate, ethyl (meth)acrylate, isopropyl (meth)acrylate, n-propyl (meth)acrylate, isobutyl (meth)acrylate, sec-butyl (meth)acrylate, n-butyl (meth)acrylate, allyl (meth)acrylate, methaallyl (meth)acrylate, vinyl (meth)acrylate, cyclohexyl (meth)acrylate, phenyl (meth)acrylate, benzyl (meth)acrylate, naphthyl methacrylate, ethyleneglycol di(meth)acrylate, diethyleneglycol di(meth)acrylate, triethyleneglycol di(meth)acrylate, 2-hydroxy-3-phenoxypropyl (meth)acrylate, 3-acryloyloxy glycerin monomethacrylate, 2, 2-bis[(meth)acryloyloxyethoxy phenyl] propane, 2, 2-bis[(meth)acryloyoxydiethoxyphenyl]propane, 2, 2-bis[(meth)acryloyloxy (2'-hydroxypropyloxy)phenyl] propane, 2-(meth)acryloyloxyethyl succinate, diisopropyl fumarate, dicyclohexyl fumarate, dibenzyl fumarate, dibenzyl itaconate, dibenzyl mesaconate, maleic anhydride and itaconic anhydride, either alone or as a mixture. The amount of the other vinyl compound(s) may preferably be 10 wt % or less based on the total weight of the polymerizable components.

For preparing the cast resin for optical use according to the present invention, preferably the polymerizable components may be mixed with a curing agent to produce a composition of the polymerizable components, which is then directly charged into a desired mold and polymerized under heating. The atmosphere of the polymerization system may preferably be that of an inert gas such as nitrogen, helium or carbon dioxide. Alternatively, the composition of the polymerizable components may be preliminarily polymerized at a temperature of preferably 30° to 70° C. before being charged into the mold for polymerization under heating.

Although the polymerization temperature used for the polymerization under heating is varied with the curing agent employed, it may preferably be 20° to 130° C. Besides, it is preferred to effect the polymerization gradually at a temperature which is lower by 20° C. than the temperature of the 10-hour half life period of the curing agent employed. The temperature may also be raised gradually for reducing the curing time or processing the non-reacted monomer or curing agent. The duration of polymerization may preferably be 5 to 48 hours.

Since the resin produced by the polymerization under heating is subject to internal strain, it may preferably be annealed preferably at 100° to 140° C., above all, 110° to 130° C., preferably for 30 minutes to 6 hours, above all, for 1 to 4 hours.

As the curing agent which may be employed, organic peroxides having the temperature of the selected 10-hour half life period of not higher than 120° C. may preferably be employed. More concretely, the curing agents preferably include benzoyl peroxides, diisopropyl peroxy dicarbonate, di-n-propyl peroxy dicarbonate, bis(4-t-butyl cyclohexyl)peroxy dicarbonate, tert-butyl peroxy isopropyl carbonate, tert-butyl peroxy benzoate and 1,1-bis(t-butyl peroxy)-3,3,5-trimethyl cyclohexne, either alone or as a mixture. The amount of the curing agent employed may preferably be 0.05 to 5 wt % and more preferably 0.1 to 4 wt % based on the weight of the polymerizable components in their entirety. If the amount of the curing agent employed is less than 0.05 wt %, sufficient polymerization is not achieved and the resultant resin becomes inferior in physical properties, whereas if it exceeds 5 wt %, the polymerization reaction becomes difficult to control so that surface cracks tend to be produced.

In the cast resin for optical use according to the present invention, the composition of the polymerizable components may be optionally admixed with coloring agents such as dyes or pigments, ultraviolet absorbing agents, antioxidants, various stabilizers, antistatic agents, photochromic compounds, fluorescent brightening agents or mold release agents.

In the cast resin for optical use according to the present invention, a hard coat film may be formed on the resin surface for further improving the abrasion resistance of the resin surface. Besides, a primer layer may be provided between the resin surface and the hard coat film for improving the adhesivity between the resin surface and the hard coat film. For providing the hard coat film, a hard coating agent may be applied by dipping, spin coating, flow coating or spraying methods on a resin substrate directly after curing following the polymerization or on a resin coated with a primer liquid.

Besides, in the cast resin for optical use according to the present invention, an anti-reflection film may be provided on the resin surface for inhibiting surface reflection for further improving transmittance of the visible light rays.

The cast resin product for optical use according to the present invention is colorless and transparent and has a high refractive index of 1.53 or higher, preferably 1.53 to 1.59 and a high Abbe's number not less than 30, preferably 30 to 45, while being superior in impact-resistance, thermal resistance and adhesivity to the hard coat film, so that it may be advantageously employed in the fields of lenses for eyeglasses, optical devices or high refractive index resin plates.

EXAMPLES OF THE INVENTION

The present invention will be explained with reference to Examples and Comparative Examples. It is noted that these Examples are given only by way of illustration and are not intended for limiting the scope of the invention.

Example 1

6 g of a prepolymer shown by the following formula (IV), 3 g of a prepolymer shown by the following formula (V) and 1 g of dibenzyl itaconate were admixed with 0.2 g of diisopropyl peroxydicarbonate to give a composition of polymerizable components. The composition was charged into a mold made up of two glass plates, in which an ethylene acrylate gasket was employed. The composition was heated for 12 hours in a constant-temperature vessel maintained at 40° C. with a curing temperature set to 40° C. The temperature was then raised to 80° C. over six hours followed by heating at 80° C. for two hours. After the end of heating, the cured resin was dismounted from the mold and annealed for two hours at 120° C.

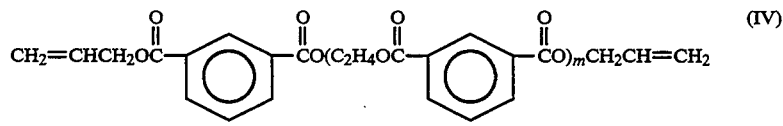

where the distribution of m is 64 wt % of the fraction with m=0, 31 wt % of the fraction with m=1, 4 wt % of the fraction with m=2 and 1 wt % of the fraction with m=3.

where the distribution of n is 52 wt % of the fraction with n=1, 36 wt % of the fraction with n=2, 9 wt % of the fraction with n=3 and 3 wt % of the fraction with n=4.

The resultant cured resin was surface treated with a 5 wt % aqueous solution of caustic soda at 40° C., and a coating solution consisting essentially of γ-glycidooxypropyl trimethoxysilane was applied on the resin surface by the dipping method. After coating, the resin was dried by a drier by heating at 110° C. for 90 minutes.

The cured resin was further provided with a hard coat film and $SiO_2$, $ZrO_2$, $Al_2O_3$ and $SiO_2$ were vapor-deposited on the resin surface in this order in an argon plasma under a vacuum of $10^{-5}$ Torr for depositing an anti-reflection coating. Various physical properties were evaluated of the produced resin product. The results are shown in Table 3.

Meanwhile, the various properties were measured by the following methods. That is, the refractive index and the Abbe's number were measured by using an Abbe's refractometer. Impact-strength was measured by dropping a steel ball weighing 68 g from a height of 127 cm. Resin product samples which were cracked were marked by x, whereas those which were not cracked were marked by circles.

Thermal resistance was measured by allowing resin samples to stand for two hours in a drier maintained at 130° C. The resin products in which changes such as deformation, cracking or coloration were observed were marked with x, whereas those in which these changes were not noticed were marked with circles. The specific weight was measured by an in-water substitution method in terms of the resin weight/resin volume.

The resistance to solvents was measured by allowing the resin products to stand in acetone for two hours, and the resin samples in which changes such as deformation, cracking or coloration were noticed were marked by x whereas those in which these changes were not noticed were marked with circles.

For measuring the adhesivity of the hard coat film, resin samples were dipped for 48 hours in water maintained at 80° C., a checkerboard pattern with 100 squares were formed on a lens surface with a razor and a sequence of application and detachment of a cellophane tape was repeated five times. The adhesivity was indicated by the number of the cellophane tapes which were left without becoming peeled off.

Examples 2 to 15

The polymerization of the resins, deposition of the hard coat films and the deposition of the anti-reflection coatings were performed in the same way as in Example 1 except that compositions of the polymerizable components shown in Table 3 were prepared by using diallyl isophthalate prepolymers shown in Table 1 and alkylene glycol bis-allyl carbonate prepolymers shown in Table 2, and various physical properties were evaluated. The results are shown in Table 3.

Comparative Examples 1 to 11

Samples of resin products were prepared in the same way as in Example 1, except employing polymerizable components shown in Table 4, and were evaluated as to various physical properties. The results are shown in Table 4.

Abbreviations used in the Tables 3 and 4 stand for the following structural formulas or compounds or prepolymers shown in Tables 1 and 2.

DBzI: dibenzyl itaconate
DBzM: dibenzyl mesaconate
BCBI: bis(2-chlorobenzyl) itaconate
BCBM: bis(2-chlorobenzyl) mesaconate
BBBI: bis(2-bromobenzyl) itaconate
MMA: methyl methacrylate
ADC: diethylene glycol bis-allyl carbonate
DAIP: diallyl isophthalate BMEPP: 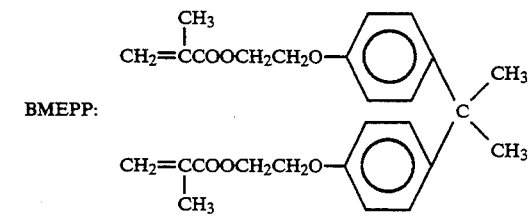

BzMA: benzyl methacrylate
BPO: benzoyl peroxide
IPP: diisopropyl peroxydicarbonate
NPP: di-n-propyl peroxydicarbonate
TCP: bis(4-t-butylcycohexyl) peroxydicarbonate
TPB: t-butyl peroxydibenzoate
TPI: t-butyl peroxyisopropyl carbonate
DATP: diallyl terephthalate
P (placed before a chemical abbreviation): poly- (i.e., PDAIP=poly diallyl isophthalate)
VL—very low viscosity
M—medium viscosity
H—high viscosity The preceding three abbreviations denote the viscosity of the oligomers used. In the tables, these letters are found in combination with numbers, i.e., 2VL, 2H, 2M, 3VL, etc. These numbers represent the number of carbon atoms in the $R_2$ and $R_3$ position in the formula, provided that when the numbers concern the $R_3$ position in the formula, it denotes half the number of carbon atoms found at position $R_3$.

TABLE 1

| Abbreviation | $R_2$ | m | Proportion (wt. %) |
|---|---|---|---|

$$CH_2=CHCH_2OC(O)-\bigcirc-CO(R_2OC(O)-\bigcirc-CO)_mCH_2CH=CH_2$$

| Abbreviation | $R_2$ | m | Proportion (wt. %) |
|---|---|---|---|
| PDAIP-2VL | $C_2H_4$ | 0 | 64 |
| | | 1 | 31 |
| | | 2 | 4 |
| | | 3 | 1 |
| PDAIP-3VL | $\text{CHCH}_2$ with $CH_3$ | 0 | 61 |
| | | 1 | 32 |
| | | 2 | 5 |
| | | 3 | 2 |
| PDAIP-4VL | $C_4H_8$ | 0 | 59 |
| | | 1 | 29 |
| | | 2 | 8 |
| | | 3 | 4 |
| PDAIP-2L | $C_2H_4$ | 0 | 48 |
| | | 1 | 28 |
| | | 2 | 15 |
| | | 3 | 6 |
| | | 4 | 3 |

TABLE 1-continued

| Abbreviation | R$_2$ | m | Proportion (wt. %) |
|---|---|---|---|
| PDAIP-3L | CH$_3$–CHCH$_2$ | 0 | 45 |
|  |  | 1 | 27 |
|  |  | 2 | 16 |
|  |  | 3 | 8 |
|  |  | 4 | 3 |
|  |  | 5 | 1 |
| PDAIP-2M | C$_2$H$_4$ | 0 | 34 |
|  |  | 1 | 25 |
|  |  | 2 | 16 |
|  |  | 3 | 10 |
|  |  | 4 | 6 |
|  |  | 5~10 | 9 |
| PDAIP-3M | CH$_3$–CHCH$_2$ | 0 | 35 |
|  |  | 1 | 26 |
|  |  | 2 | 17 |
|  |  | 3 | 11 |
|  |  | 4 | 5 |
|  |  | 5~10 | 6 |
| PDAIP-2H | C$_2$H$_4$ | 0 | 20 |
|  |  | 1 | 22 |
|  |  | 2 | 16 |
|  |  | 3 | 16 |
|  |  | 4 | 10 |
|  |  | 5 | 6 |
|  |  | 6~20 | 10 |

$$CH_2=CHCH_2OCO\text{-}\underset{}{\bigcirc}\text{-}CO(R_2OCO\text{-}\underset{}{\bigcirc}\text{-}CO)_mCH_2CH=CH_2$$

| Abbreviation | R$_2$ | m | Proportion (wt. %) |
|---|---|---|---|
| PDATP-2VL | C$_2$H$_4$ | 0 | 64 |
|  |  | 1 | 31 |
|  |  | 2 | 4 |
|  |  | 3 | 1 |
| PDATP-3VL | CH$_3$–CHCH$_2$ | 0 | 61 |
|  |  | 1 | 32 |
|  |  | 2 | 5 |
|  |  | 3 | 2 |
| PDATP-3L | CH$_3$–CHCH$_2$ | 0 | 45 |
|  |  | 1 | 27 |
|  |  | 2 | 16 |
|  |  | 3 | 8 |
|  |  | 4 | 3 |
|  |  | 5 | 1 |
| PDATP-2M | C$_2$H$_4$ | 0 | 34 |
|  |  | 1 | 25 |
|  |  | 2 | 16 |
|  |  | 3 | 10 |
|  |  | 4 | 6 |
|  |  | 5~10 | 9 |
| PDATP-3M | CH$_3$–CHCH$_2$ | 0 | 35 |
|  |  | 1 | 26 |
|  |  | 2 | 17 |
|  |  | 3 | 11 |
|  |  | 4 | 5 |
|  |  | 5~10 | 6 |

TABLE 2

$$CH_2=CHCH_2OCO(R_3OCO)_nCH_2CH=CH_2$$

| Abbreviation | R$_3$ | n | Proportion (wt. %) |
|---|---|---|---|
| PADC-2L | C$_2$H$_4$OC$_2$H$_4$ | 1 | 52 |
|  |  | 2 | 36 |
|  |  | 3 | 9 |
|  |  | 4 | 3 |
| PADC-3L | CH$_3$–CHCH$_2$OCHCH$_2$–CH$_3$ | 1 | 50 |
|  |  | 2 | 37 |
|  |  | 3 | 10 |
|  |  | 4 | 3 |
| PADC-2M | C$_2$H$_4$OC$_2$H$_4$ | 1 | 34 |
|  |  | 2 | 33 |

TABLE 2-continued $$CH_2=CHCH_2OCO(R_3OCO)nCH_2CH=CH_2$$

| Abbreviation | R₃ | n | Proportion (wt. %) |
|---|---|---|---|
| | | 3 | 17 |
| | | 4 | 10 |
| | | 5~8 | 6 |
| PADC-2H | C₂H₄OC₂H₄ | 1 | 21 |
| | | 2 | 30 |
| | | 3 | 20 |
| | | 4 | 15 |
| | | 5 | 8 |
| | | 6~10 | 6 |

TABLE 3

| Ex. | Polymerizable Comp. (g) | | Curing Agent (g) | Curing Temp. (°C.) | Refractive index | Abbe's number | Impact-strength | Heat-resistance | S.G. | Solvent-resistance | Adhesivity to hard coat film |
|---|---|---|---|---|---|---|---|---|---|---|---|
| 1 | PDAIP-2VL | (6) | IPP (0.2) | 40 | 1.552 | 38 | ○ | ○ | 1.271 | ○ | 100 |
| | PADC-2H | (3) | | | | | | | | | |
| | DBzI | (1) | | | | | | | | | |
| 2 | PDAIP-3VL | (7) | NPP (0.2) | 40 | 1.557 | 37 | ○ | ○ | 1.265 | ○ | 100 |
| | PADC-2H | (2) | | | | | | | | | |
| | DBzM | (1) | | | | | | | | | |
| 3 | PDAIP-4VL | (4) | TPB (0.3) | 40 | 1.552 | 36 | ○ | ○ | 1.300 | ○ | 100 |
| | PADC-2M | (4) | | | | | | | | | |
| | BCBI | (2) | | | | | | | | | |
| 4 | PDAIP-2L | (6) | TPI (0.3) | 40 | 1.574 | 33 | ○ | ○ | 1.262 | ○ | 100 |
| | PADC-2H | (1) | | | | | | | | | |
| | BCBM | (3) | | | | | | | | | |
| 5 | PDAIP-3L | (5) | BPO (0.1) | 70 | 1.543 | 36 | ○ | ○ | 1.291 | ○ | 100 |
| | PADC-2M | (4.5) | | | | | | | | | |
| | BBBI | (0.5) | | | | | | | | | |
| 6 | PDAIP-2M | (4) | BPO (0.1) | 70 | 1.540 | 39 | ○ | ○ | 1.294 | ○ | 100 |
| | PADC-2M | (5) | | | | | | | | | |
| | DBzI | (1) | | | | | | | | | |
| 7 | PDAIP-3M | (6.5) | IPP (0.2) | 40 | 1.551 | 38 | ○ | ○ | 1.267 | ○ | 100 |
| | PADC-3L | (3) | | | | | | | | | |
| | DBzI | (0.5) | | | | | | | | | |
| 8 | PDAIP-2H | (8.5) | IPP (0.2) | 40 | 1.558 | 37 | ○ | ○ | 1.255 | ○ | 100 |
| | PADC-2L | (1) | | | | | | | | | |
| | DBzM | (0.5) | | | | | | | | | |
| 9 | PDATP-2VL | (5) | TCP (0.3) | 40 | 1.549 | 39 | ○ | ○ | 1.280 | ○ | 100 |
| | PADC-2H | (4) | | | | | | | | | |
| | DBzM | (1) | | | | | | | | | |
| 10 | PDATP-3VL | (5.5) | TPB (0.3) | 100 | 1.554 | 38 | ○ | ○ | 1.268 | ○ | 100 |
| | PADC-2H | (3) | | | | | | | | | |
| | DBzI | (0.5) | | | | | | | | | |
| | DBzM | (1) | | | | | | | | | |
| 11 | PDATP-3L | (6) | NPP (0.2) | 40 | 1.567 | 35 | ○ | ○ | 1.287 | ○ | 100 |
| | PADC-2M | (5) | | | | | | | | | |
| | DBzI | (1.5) | | | | | | | | | |
| | DBzM | (1.5) | | | | | | | | | |
| 12 | PDATP-2M | (4) | TPI (0.3) | 100 | 1.533 | 41 | ○ | ○ | 1.294 | ○ | 100 |
| | PADC-3L | (5.5) | | | | | | | | | |
| | DBzI | (0.25) | | | | | | | | | |
| | DBzM | (0.25) | | | | | | | | | |
| 13 | PDATP-3M | (5) | IPP (0.2) | 40 | 1.563 | 33 | ○ | ○ | 1.286 | ○ | 100 |
| | PADC-2L | (2.5) | | | | | | | | | |
| | BCBI | (2) | | | | | | | | | |
| | BCBM | (0.5) | | | | | | | | | |
| 14 | PDAIP-3VL | (6) | NPP (0.2) | 40 | 1.555 | 37 | ○ | ○ | 1.266 | ○ | 100 |
| | PADC-2L | (2.5) | | | | | | | | | |
| | BzMA | (0.5) | | | | | | | | | |
| | DBzI | (1) | | | | | | | | | |
| 15 | PDAIP-2M | (5) | TCP (0.3) | 40 | 1.553 | 37 | ○ | ○ | 1.285 | ○ | 100 |
| | PADC-2L | (3) | | | | | | | | | |
| | BMEPP | (1) | | | | | | | | | |
| | DBzM | (1) | | | | | | | | | |

TABLE 4

| Comp. Ex. | Polymerizable Comp. (g) | | Curing Agent (g) | Curing Temp. (°C.) | Refractive index | Abbe's number | Impact-strength | Heat-resistance | S.G. | Solvent-resistance | Adhesivity to hard coat film |
|---|---|---|---|---|---|---|---|---|---|---|---|
| 1 | MMA | (10) | BPO (0.1) | 70 | 1.492 | 58 | ○ | X | 1.191 | X | 24 |
| 2 | styrene | (10) | BPO (0.1) | 70 | 1.591 | 32 | ○ | X | 1.054 | X | 7 |
| 3 | ADC | (10) | IPP (0.3) | 40 | 1.499 | 55 | X | ○ | 1.327 | ○ | 100 |
| 4 | DAIP | (7) | IPP (0.3) | 40 | 1.561 | 37 | X | ○ | 1.276 | ○ | 100 |
| | ADC | (3) | | | | | | | | | |
| 5 | styrene | (5) | BPO (0.1) | 70 | 1.582 | 33 | X | ○ | 1.170 | ○ | 14 |
| | BMEPP | (5) | | | | | | | | | |

TABLE 4-continued

| Comp. Ex. | Polymerizable Comp. (g) | | Curing Agent (g) | Curing Temp. (°C.) | Refractive index | Abbe's number | Impact-strength | Heat-resistance | S.G. | Solvent-resistance | Adhesivity to hard coat film |
|---|---|---|---|---|---|---|---|---|---|---|---|
| 6 | PDAIP-2VL | (10) | IPP (0.2) | 40 | 1.570 | 35 | X | O | 1.249 | O | 100 |
| 7 | PADC-2H | (10) | IPP (0.2) | 40 | 1.508 | 50 | O | O | 1.329 | O | 100 |
| 8 | PDAIP-2L ADC | (7) (3) | IPP (0.2) | 40 | 1.547 | 38 | X | O | 1.271 | O | 100 |
| 9 | DAIP PADC-2H | (9) (1) | NPP (0.2) | 40 | 1.564 | 36 | X | O | 1.276 | O | 100 |
| 10 | PDAIP-2M PADC-2M | (9.5) (0.5) | IPP (0.2) | 40 | 1.561 | 36 | X | O | 1.256 | O | 91 |
| 11 | PDATP-2M PADC-2M | (3.5) (6.5) | IPP (0.2) | 40 | 1.527 | 42 | O | O | 1.297 | O | 100 |

Although the present invention has been described with reference to the preferred examples, it should be understood that various modifications and variations can be easily made by those skilled in the art without departing from the spirit of the invention. Accordingly, the foregoing disclosure should be interpreted as illustrative only and is not to be interpreted in a limiting sense. The present invention is limited only by the scope of the following claims.

What is claimed is:

1. A cast resin for optical use obtained by polymerizing 40 to 89 wt % of a diallyl phthalate component represented by the formula (I)

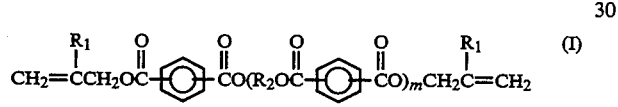

wherein —$R_1$ is a hydrogen atom or a methyl group, —$OR_2$ is a dihydric alcohol residue having 1 to 5 carbon atoms and m is an integer from 0 to 20 wherein the fraction of said diallyl phthalate component where m=0 ranges from 20 to 70 wt %, the fraction where m=1 ranges from 20 to 40 wt %, the fraction where m=2 ranges from 1 to 20 wt %, the fraction where m=3 ranges from 0 to 20 wt %, the fraction where m=4 ranges from 0 to 15 wt %, the fraction where m=5 ranges from 0 to 10 wt %, and the fraction where $6 \leq m \leq 20$ ranges from 0 to 10 wt %;

with 10 to 59 wt % of an alkylene glycol bis-allyl carbonate component represented by the formula (II)

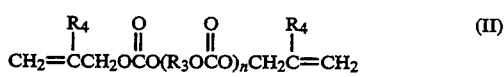

wherein —$R_4$ is a hydrogen atom or a methyl group, —$OR_3$ is a dihydric alcohol residue having 1 to 10 carbon atoms and n is an integer of from 0 to 10 wherein the fraction of said alkylene glycol bis-allyl carbonate component where n=1 ranges from 20 to 60 wt %, the fraction where n=2 ranges from 25 to 40 wt %, the fraction where n=3 ranges from 5 to 25 wt %, the fraction where n=4 ranges from 1 to 20 wt %, and the fraction where $5 \leq n \leq 10$ ranges from 0 to 15 wt %, and 1 to 30 wt % of a vinyl compound represented by the formula (III)

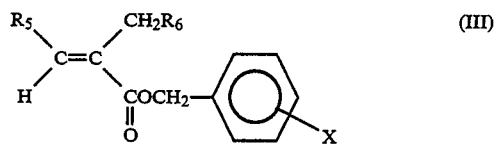

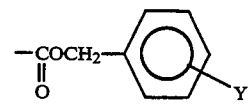

wherein —$R_5$ and —$R_6$ each indicate different groups and stand for a hydrogen atom or group wherein X and Y each indicate a hydrogen atom or a halogen atom other than a fluorine atom.

2. The cast resin for optical use according to claim 1 wherein said diallyl phthalate component is prepared by ester interchange reaction between a diallyl phthalate with a dihydric alcohol.

3. The cast resin for optical use according to claim 2 wherein said diallyl phthalate is selected from the group consisting of diallyl phthalate, diallyl isophthalate, diallyl terephthalate and mixtures thereof.

4. The cast resin for optical use according to claim 2 wherein said dihydric alcohol is selected from the group consisting of ethylene glycol, propylene glycol, 1,3-propanediol, 1,4-butanediol, 1,3-butanediol, neopentyl glycol and mixtures thereof.

5. The cast resin for optical use according to claim 1 wherein said alkylene glycol bis-allyl carbonate component is prepared by ester interchange reaction between a diallyl carbonate and a dihydric alcohol.

6. The cast resin for optical use according to claim 5 wherein said dihydric alcohol is selected from the group consisting of ethylene glycol, propylene glycol, 1,3-propanediol, 1,4-butanediol, 1,3-butanediol, neopentyl glycol, diethylene glycol, dipropylene glycol and mixtures thereof.

7. The cast resin for optical use according to claim 1 wherein the vinyl compound represented by the formula (III) is selected from the group consisting of dibenzyl itaconate, dibenzyl mesaconate, bis(2-chlorobenzyl) itaconate, bis(4-chlorobenzyl) itaconate, bis(2-chlorobenzyl) mesaconate, bis(4-chlorobenzyl) mesaconate, bis(2-bromobenzyl) itaconate, bis(4-bromobenzyl) itaconate, bis(2-bromobenzyl) mesaconate, bis(4-bromobenzyl) mesaconate and mixtures thereof.

8. The cast resin for optical use according to claim 1 further comprising a vinyl monomer different from the components (I), (II) or (III), selected from the group consisting of styrene, p-methylstyrene, p-chlorostyrene, divinyl benzene, α-methylstyrene, vinyl acetate, vinyl benzoate, allyl benzoate, divinyl phthalate, vinyl naphthalene, (meth)acrylic acid, 2-hydroxyethyl (meth)acrylate, 2-hydroxypropyl (meth)acrylate, glycidyl (meth)acrylate, methyl (meth)acrylate, ethyl (meth)acrylate, isopropyl (meth)acrylate, n-propyl (meth)acrylate, isobutyl (meth)acrylate, sec-butyl (meth)acrylate, n-butyl (meth)acrylate, allyl (meth)acrylate, methaallyl (meth)acrylate, vinyl (meth)acrylate, cyclohexyl (meth)acrylate, phenyl (meth)acrylate, benzyl (meth)acrylate, naphthyl methacrylate, ethyleneglycol di(meth)acrylate, diethyleneglycol di(meth)acrylate, triethyleneglycol di(meth)acrylate, 2-hydroxy-3-phenoxypropyl (meth)acrylate, 3-acryloyloxy glycerin monomethacrylate, 2,2-bis[(meth)acryloyloxyethoxyphenyl] propane, 2,2-bis[(meth)acryloyoxydiethoxyphenyl] propane, 2,2-bis[(meth)acryloyloxy (2'-hydroxypropylox)yphenyl] propane, 2-(meth)acryloyloxyethyl succinate, diisopropyl fumarate, dicyclohexyl fumarate, dibenzyl fumarate, dibenzyl itaconate, dibenzyl mesaconate, maleic anhydride, itaconic anhydride and mixtures thereof.

9. The cast resin for optical use according to claim 8 wherein a proportion of the vinyl monomer accounts for not more than 10 wt % based on the total weight of polymerizable components.

10. The cast resin for optical use according to claim 1 wherein the refractive index and Abbe's number are 1.53 or higher and 30 or higher, respectively.

* * * * *